United States Patent [19]

Lin

[11] Patent Number: 5,311,209
[45] Date of Patent: May 10, 1994

[54] ASSEMBLED PHOTOCMECHANICAL MOUSE STRUCTURE

[75] Inventor: Chia H. Lin, Taipei, Taiwan

[73] Assignee: Sysgration Ltd., Taipei, Taiwan

[21] Appl. No.: 36,167

[22] Filed: Mar. 24, 1993

[51] Int. Cl.$^5$ .................................. G09G 3/02
[52] U.S. Cl. .................................. 345/165; 345/164
[58] Field of Search .................. 340/706, 709, 710; 250/231.14, 231.15; 74/471 XY; 200/5 A, 5 R; 345/166, 165, 164, 163, 167, 157, 156

[56] References Cited

U.S. PATENT DOCUMENTS

| | | | |
|---|---|---|---|
| 3,541,521 | 12/1967 | Koster | 340/710 |
| 3,987,685 | 10/1976 | Opocensky | 340/710 |
| 4,806,917 | 2/1989 | Hosogoe | 74/471 XY |
| 4,892,312 | 1/1990 | Minemoto | 250/231.15 |

*Primary Examiner*—Alvin E. Oberley
*Assistant Examiner*—Aaron Banerjee
*Attorney, Agent, or Firm*—Bacon & Thomas

[57] ABSTRACT

An assembled photomechanical mouse structure including a bottom casing, an upper cover associated with the bottom casing, a circuit board enclosed by the bottom casing and upper cover, a ball member, two slotted discs, an idle roller, and a photoelectrical set composed of an LED and a double-chip phototransistor, wherein the bottom casing is integrally formed with stepped supports for fitting the circuit board thereon, two shaft posts and a roller support, and the circuit board is located on a front section of the bottom casing, extending from front end thereof only to the position of the slotted discs, on one side of the circuit board adjacent to the slotted discs being formed with an X direction and a Y direction rectangular slots whereby the LED and phototransistor are disposed on two opposite sides of each of the slots, the shaft post being formed with a shaft hole and a slant slide channel located thereabove, whereby the slotted disc can be pushed through the slant guide channels of two opposite shaft posts until protuberances of a shaft section of the slotted disc are inserted into the shaft holes so as to permit the slotted disc to freely rotate about the axis of the shaft section, the roller support being S-shaped leaf spring having a rectangular recess for fitting the idle roller therein.

3 Claims, 7 Drawing Sheets

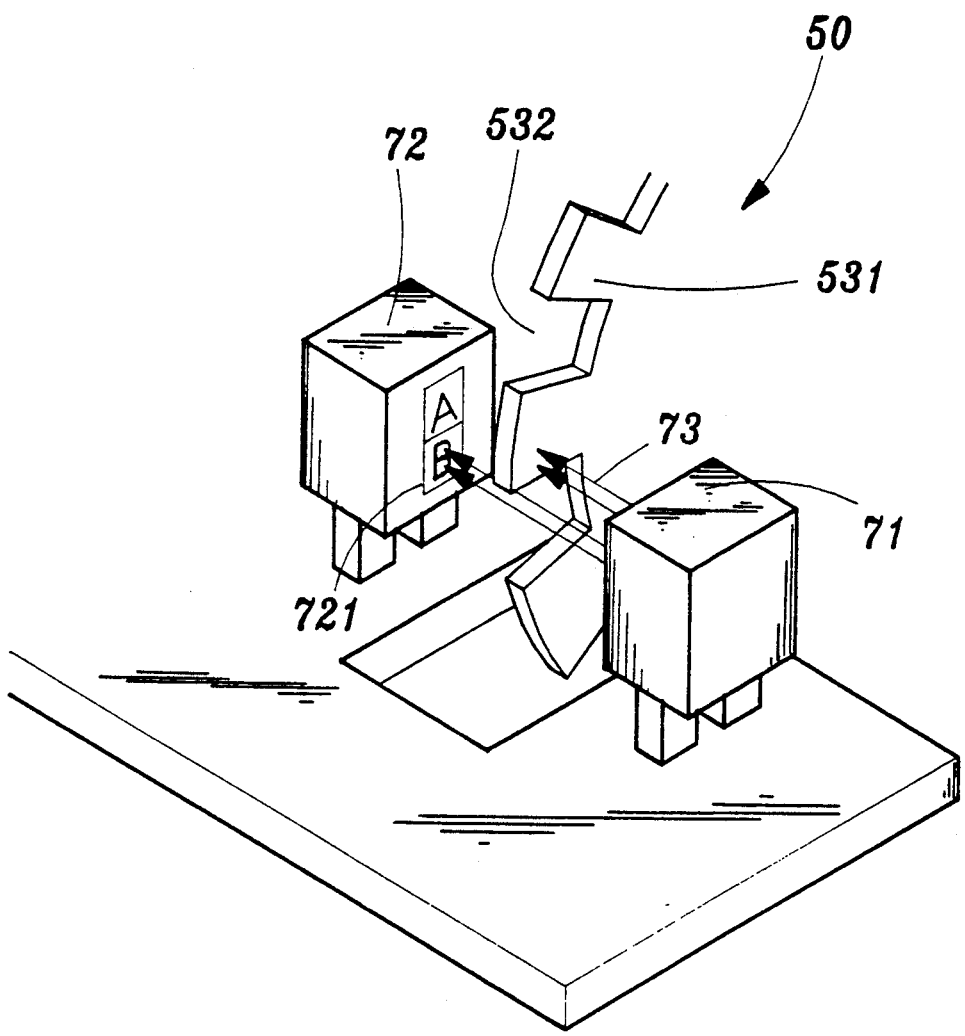

ASSEMBLED PHOTOCMECHANICAL MOUSE STRUCTURE

BACKGROUND OF THE INVENTION

The present invention relates to a photomechanical mouse structure, and more particularly to a mouse structure which can be easily manufactured at low cost and in which the proportion of malfunctional products is reduced.

Conventional photomechanical mouse structure is generally composed of two LEDs, two phototransistors, a qrid means, a ball member rotatably mounted in a ball hole formed on a PC board, which drives the grid means to allow or prevent the passage of the light emitted from the LED to the phototransistor. Such mouse structure is disclosed in U.S Pat. No. 4,464,652 which relates to a cursor control device including a unitary frame, having a domed housing, idler wheel block, detecting block, encoder assembly, all of which are mounted on a PC board.

U.S. Pat. No. 4,533,830 discloses an optical encoder which uses shutters for shuttering of the light source to one of two light sensors to indicate minus or plus movement. In addition, U.S. Pat. No. 4,654,525 discloses an optical rotary encoder which use four photodiodes and a detection circuit on a single substrate. U.S. Pat. No. 4,705,943 discloses a rotational optical encoder which uses a reflector on one surface and the other surface comprises two phototransistors arranged on either side of the emitting diode.

All the above conventional devices have the following shortcomings:

(1) The circuit board mounted in the lower casing of the mouse is as large as the lower casing so that the material is wasted and the cost is higher.
(2) The components mounted in the casing of the mouse, such as the X, Y direction rotary shafts, slotted discs, etc. are difficult to be assembled and thus the manufacturing of the mouse is complicated.
(3) The slotted discs are composed of parts made of different materials so that the assembly thereof is labor-wasting and time-wasting.
(4) The idle roller is installed on a roller post and the installation thereof is difficult so that the automatic production of the mouse can be hardly performed.
(5) The idle roller is mounted on the roller post and more parts thereof are required so that the manufacturing cost is relatively high.

In view of the above, the conventional mouse structures are not well designed and the cost thereof is higher. Moreover, the proportion of malfunctional products is higher.

SUMMARY OF THE INVENTION

It is therefore an object of this invention to provide a mouse structure which uses reduced parts and can be easily manufactured at low cost and with low proportion of malfunctional products.

According to the above object, the slotted disc of the present invention is integrally composed of a rotary shaft section, a drive disc section and a slotted disc section, which can be directly inserted into an shaft post. Moreover, the idle roller is rotatably mounted on an integral roller support. The circuit board is fitted on and clamped by the stepped supports formed on the bottom casing of the mouse and the ball hole is formed at a central portion of the bottom casing with the ball member located within the ball hole. The circuit board is located on a front section of the bottom casing, extending from front end thereof only to the position of the slotted discs. On one side of the circuit board adjacent to the slotted discs is formed with an X direction and a Y direction rectangular slots whereby the LED and the phototransistor are disposed on two opposite sides of each of the slots.

BRIEF DESCRIPTION OF THE DRAWINGS

FIGS. 3A–3D show the encoding movements of the photoelectrical set of the present invention.

DETAILED DESCRIPTION OF THE PREFERRED EMBODIMENTS

Figure 1:
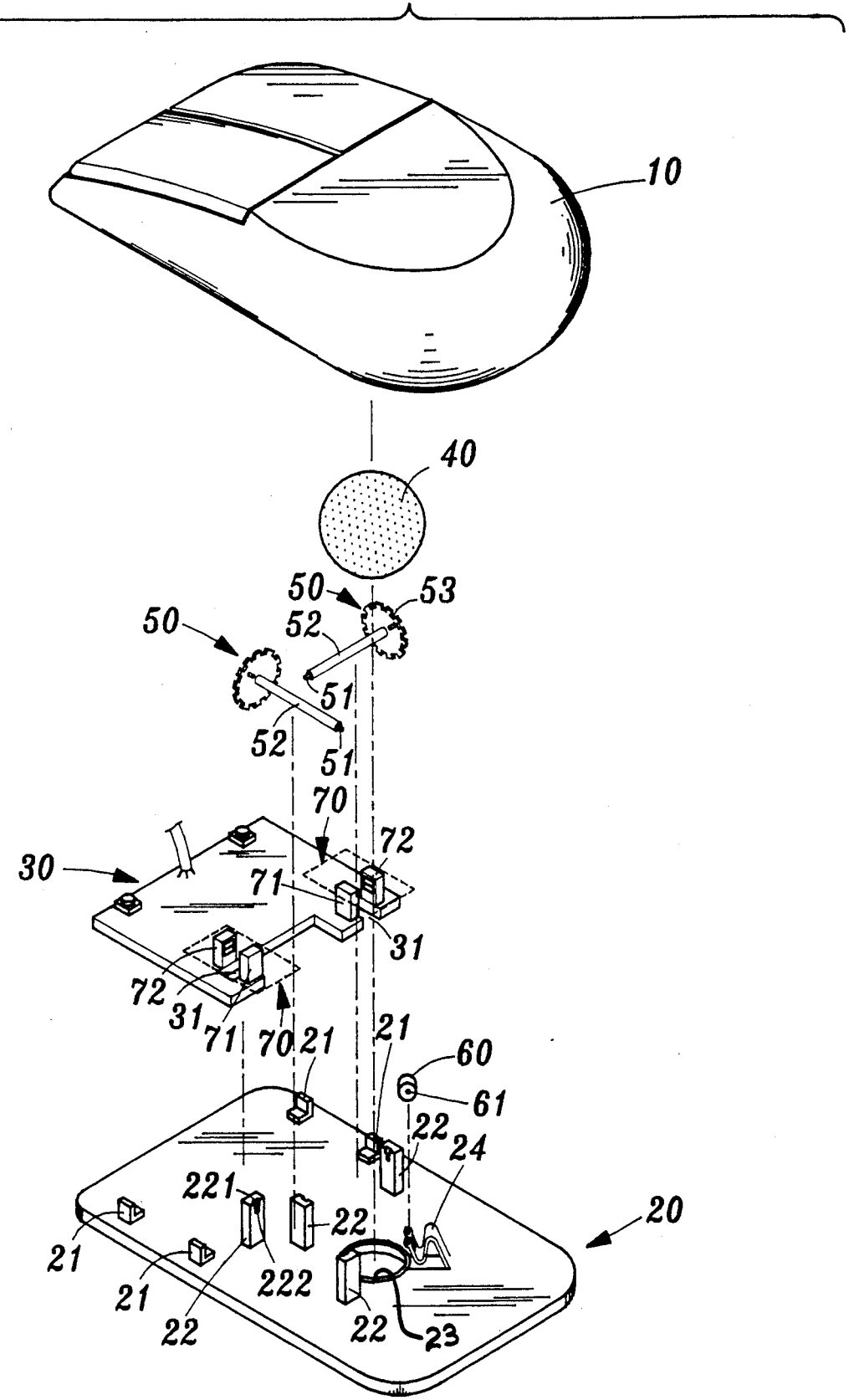
FIG. 1 is perspective exploded view of the mouse structure of the present invention.
Figure 1A:
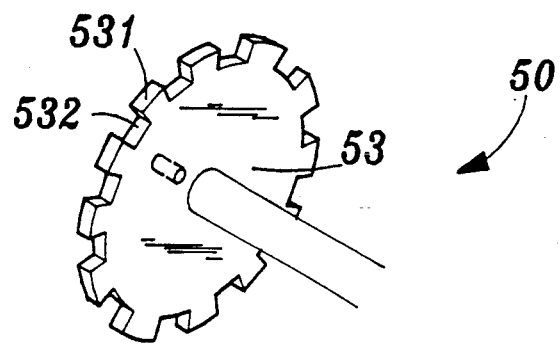
FIG. 1A is an enlarged view of the slotted disc of Fig.1.
Figure 1B:
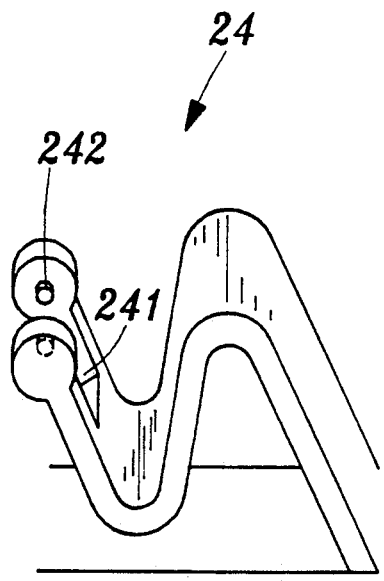
FIG. 1B is an enlarged view of the roller support of Fig.1.
Figure 2:
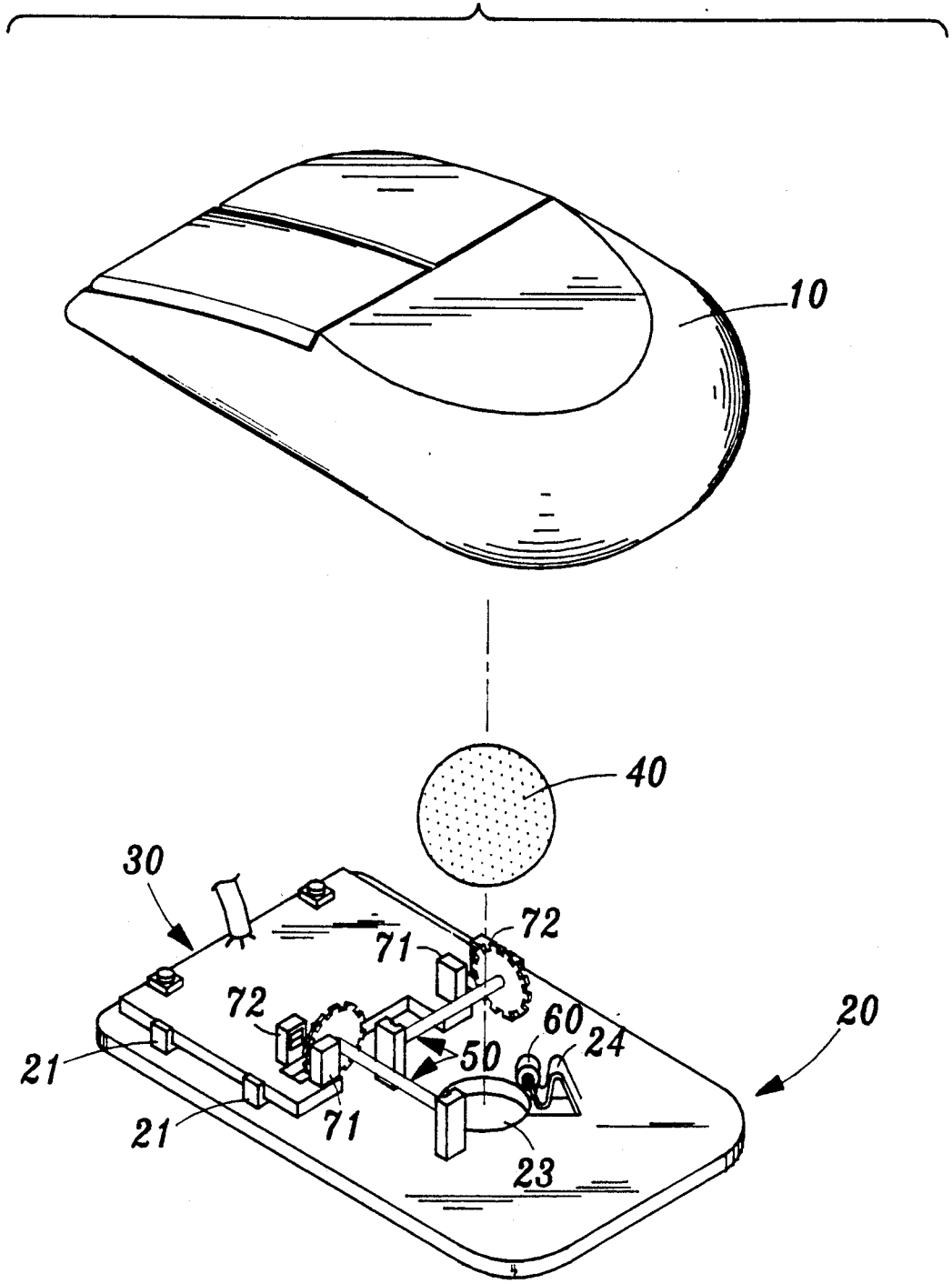
FIG. 2 is a partially exploded view according to Fig.1.

Please first refer to FIGS. 1, 1A and 1B. The mouse structure of the present invention mainly includes an upper cover 10, a bottom casing 20, a circuit board 30, a ball member 40, two slotted discs 50, an idle roller 60 having shaft holes 61 and two photoelectrical set 70 each of which includes an LED 71 and a double-chip phototransistor, wherein the bottom casing 20 is integrally formed with four stepped supports 21, two pairs of shaft posts 22, a ball hole 23 and a roller support 24. Please now refer to FIG. 2, wherein the circuit board 30 is fitted on and clamped by the stepped supports 21 and the ball hole 23 is formed at a central portion of the bottom casing 20 with the ball member 40 located within the ball hole 23. The circuit board 30 is located on a front section of the bottom casing 20, extending from front end thereof only to the position of the slotted discs 50. On one side of the circuit board 30 adjacent to the slotted discs 50 is formed with an X direction and a Y direction rectangular slots 31 whereby the LED 71 and the phototransistor 72 are disposed on two opposite sides of each of the slots 31. The slotted disc 50 is integrally composed of a disc section 53 formed peripheral slotted wall and a shaft section 52 formed with two end protuberances 51. The shaft post 22 is formed with a shaft hole 222 and a slant slide channel 221 located thereabove, whereby the slotted disc 50 can be pushed through the slant guide channels 221 of two opposite shaft posts 22 until the protuberances of the shaft section 52 are inserted into the shaft holes 222 so as to permit the slotted disc 50 to freely rotate about the axis of the shaft section 52. The shaft sections 52 of the two slotted discs 50 contact with the ball member 40 and the disc sections 53 of the two slotted discs 50 are allowed to rotate through the rectangular slots 31 of the circuit board 30, whereby when the ball member 40 rolls, the slotted discs 50 are driven thereby to rotate and thus slots of the slotted wall 531 of the slotted discs 50 allow or prevent the passage of light emitted from the LED 71 to the phototransistor 72 so as to produce encoding effect.

The roller support 24 is a U-shaped leaf spring having two upper uprights and a rectangular recess 241 formed therebetween. An engaging boss 242 is formed on inner side of each of the uprights for fitting into the shaft holes 61 of the idle roller 60 so as to freely rotatably mount the idle roller 60 on the roller support 24. When the ball member 40 rolls, the idle roller 60 abuts against the ball member 40, making the same closely contact with the shaft sections 52 of the slotted discs.

Figure 3A:
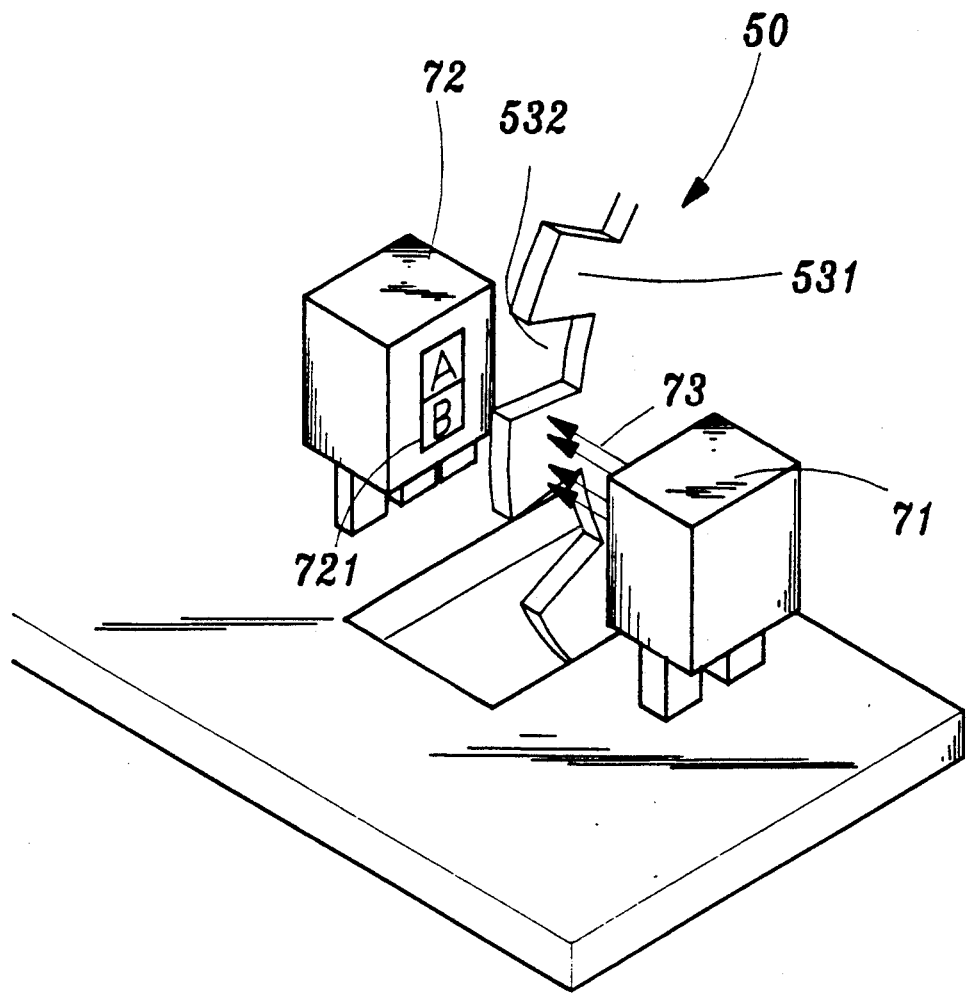

Please refer to FIG. 3. The slotted wall 531 with slots 532 allows or prevents passage of the light 73 emitted from the LED 71 to the phototransistor 72. The width of the slotted wall 531 and the slot 532 is equal to that of the chips 721 of the phototransistor 72 so that when the slotted disc 50 rotates, the adjacent chips A, B of the phototransistor 72 produce two corresponding signals in the following four states:

(1) The light 73 is totally shielded by the slotted wall 531 and the chips A, B both fail to receive light as shown in FIG. 3A such that the output of the chips A, B is indicated as follows:
[A B/0 0 ]

(2) A part of the light 73 is shielded by the slotted wall 531 and thus the chip A fails to receive light while a part of the light 73 passes through the slot 532 to be received by the chip B as shown by FIG. 3B such that the output of the chips A, B is indicated as follows:
[A B/0 1 ]

Figure 3C:
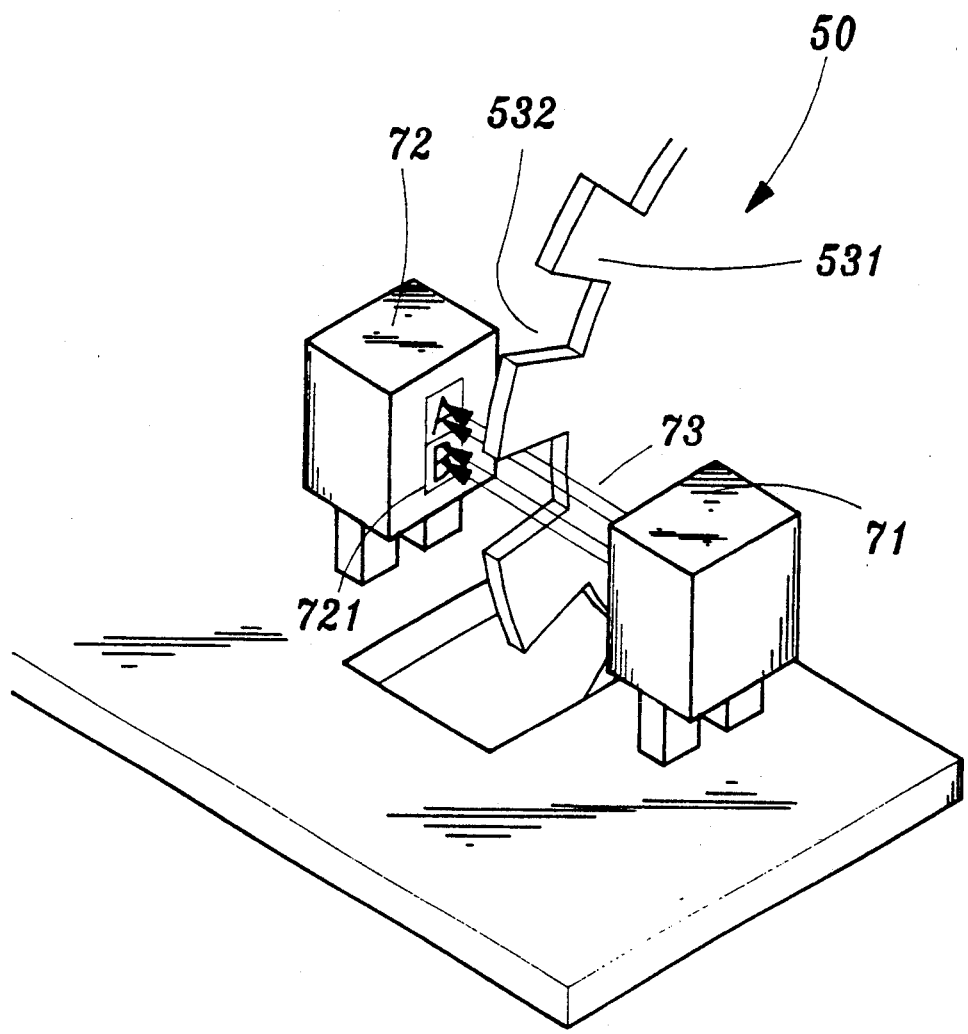

(3) The slot 532 is aligned with the chips A, B and the both the chips A, B receive the light as shown in FIG. 3C such that the output of the chips A, B is indicated as follows:
[A B/1 1 ]

Figure 3D:
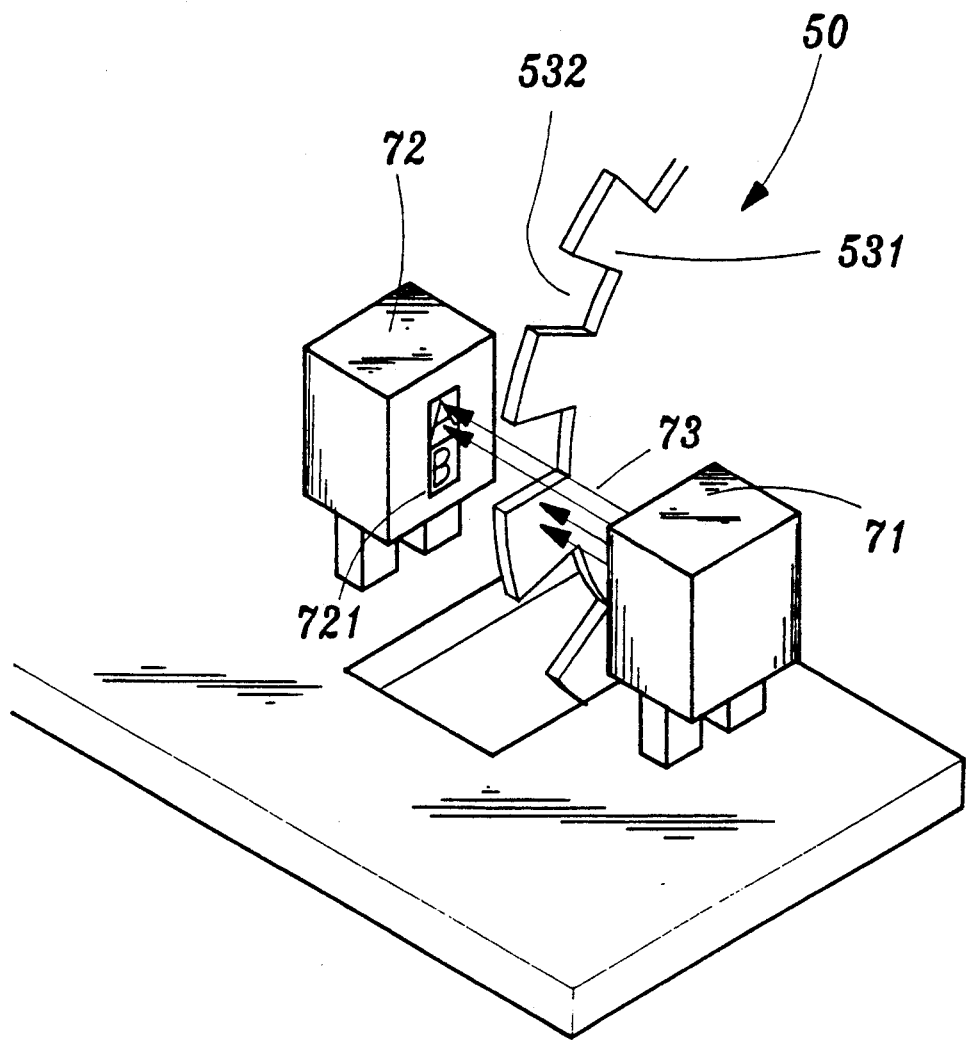

(4) A part of the light 73 is shielded by the slotted wall 531 and the chip B fails to receive the light while the chip A receives a part of the light 73 as shown in FIG. 3D such that the output of chips A, B is indicated as follows:
[A B/1 0 ]

When the chip A of the phototransistor 72 receives the light, the chip A works and the output of a signal processing circuit of the circuit board 30 is a high A pulse signal denoted by [1]. When the chip A is shielded by the slotted wall 531 and does not work, the output of the signal processing circuit is a low A pulse signal denoted by [0]. The chip B works similarly to the chip A.

After combining the states of chips A, B, the above four states can be obtained. By means of combining the four states, the respective signal series of the chips A, B can be obtained. By means of the ascending or descending of the phase of the two signal series, it can be decided that whether the mouse is moved forward or backward. The combining pattern can be exemplified by the following two modes:

(1) If the clockwise rotation of the slotted disc is the forward direction, then the combining sequence shown in FIG. 3 is:
3A-3B-3C-3D-3A . . .

While if the counterclockwise rotation of the slotted disc is backward direction, then the combining sequence shown in FIG. 3 is:
3A-3D-3C-3B-3A

What is claimed is:

1. An assembled photomechanical mouse structure comprising:
   a bottom casing;
   an upper cover associated with said bottom casing;
   a circuit board enclosed by said bottom casing and upper cover;
   a ball member;
   two slotted discs;
   an idle roller; and
   a photoelectrical set composed of an LED and a double-chip phototransistor, said mouse structure being characterized in that said bottom casing is integrally formed with stepped supports for fitting said circuit board thereon, two shaft posts and a roller support, wherein said circuit board is located on a front section of said bottom casing, extending from front end thereof only to the position of said slotted discs and on one side of said circuit board adjacent to said slotted discs is formed with an X direction and a Y direction rectangular slots whereby said LED and phototransistor are disposed on two opposite sides of each of said slots, said slotted disc being composed of a disc section formed with slotted wall and a shaft section formed with two end protuberances, said shaft post being formed with a shaft hole and a slant slide channel located thereabove, whereby said slotted disc can be pushed through the slant guide channels of two opposite shaft posts until said protuberances of said shaft section are inserted into said shaft holes so as to permit said slotted disc to freely rotate about the axis of said shaft section, said roller support being S-shaped leaf spring having two upper uprights and a rectangular recess formed therebetween, an engaging boss being formed on inner side of each of said uprights for fitting into said shaft holes said idle roller so as to freely rotatably mount said idle roller on said roller support, whereby when said ball member rolls, said idle roller abuts against said ball member, making the same closely contact with said shaft sections of said slotted discs so as to drive the disc section thereof to rotate between said LED and phototransistor for creating intermittent signals and producing encoding effect.

2. A mouse structure as claimed in claim 1, wherein said slotted disc is integrally composed of said disc section and said shaft section and said slotted wall of said disc section is disposed along outer periphery of said disc section.

3. A mouse structure as claimed in claim 1, wherein said double-chip phototransistor has two adjacent chips, whereby when said slotted disc rotates to allow or prevent the passage of the light emitted from said LED to said phototransistor, said two adjacent chips produce sensing or not sensing signals and by means of the time difference between the sensing signals of said chips, which causes the sequential difference between the signals, it can be determined whether said mouse structure is moved forward or backward.

* * * * *